United States Patent Office 3,462,844
Patented Aug. 26, 1969

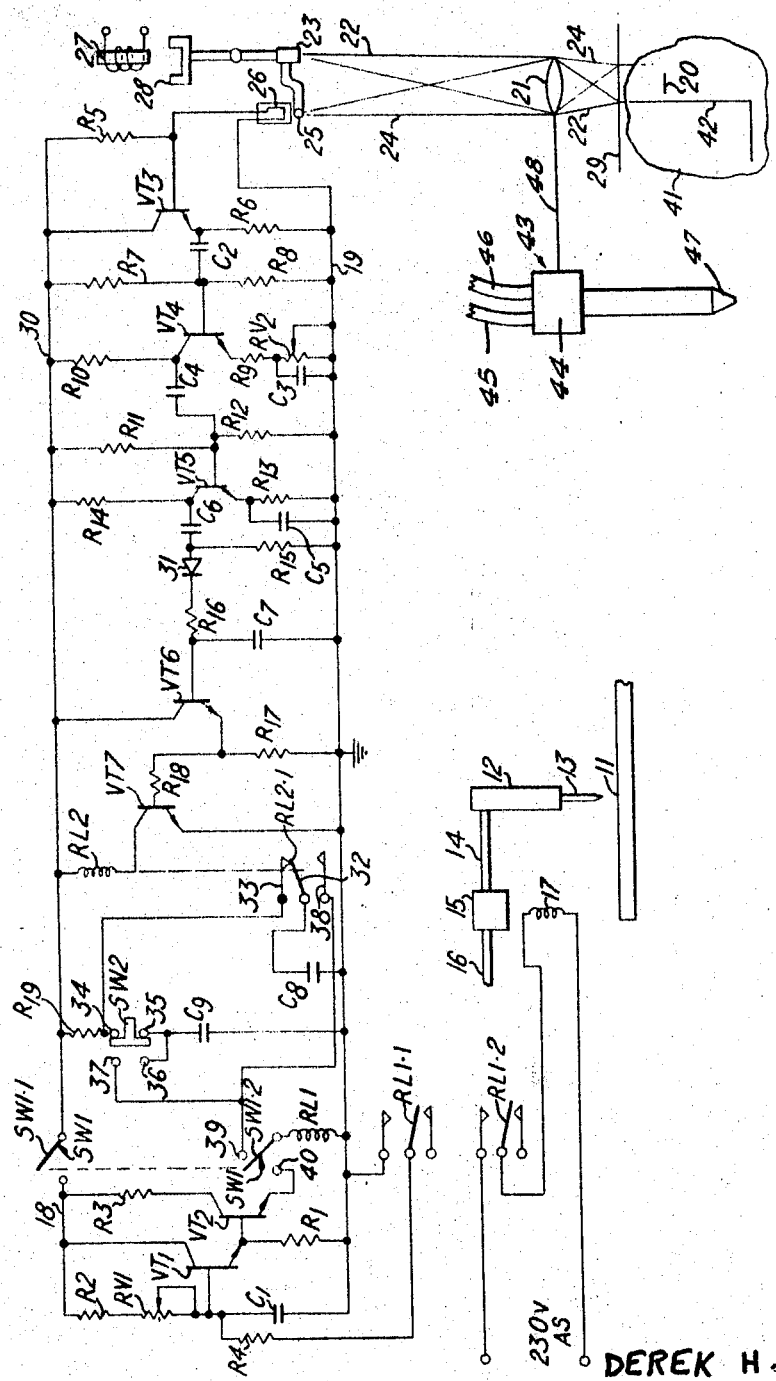

3,462,844
AUTOMATIC PUNCH CONTROL CIRCUIT
Derek Harry Redman, Croydon, England, assignor to Hancock & Co. (Engineers) Limited, Croydon, England, a British company
Filed Nov. 28, 1966, Ser. No. 597,298
Claims priority, application Great Britain, Dec. 1, 1965, 51,003/65
Int. Cl. B43l 13/10; B23k 7/10; B26d 9/00
U.S. Cl. 33—18                     5 Claims

ABSTRACT OF THE DISCLOSURE

An automatic punch control apparatus for use in an oxygen jet cutting machine having a cutting torch for automatically cutting a workpiece to the shape of an outline which is followed by a photoelectric line follower, in which a marking punch is mounted for movement with the cutting torch and means actuated by control circuitry are provided for causing the punch to make marks on the workpiece while it is being cut, either at regular timed intervals or in accordance with marks on the substrate carrying the outline.

---

This invention relates generally to automatic oxygen jet cutting machines which are arranged to cut a workpiece to a shape determined by an outline on a substrate, and more particularly to an automatic punch control apparatus for use in such machines.

When cutting steel plates to shape in a oxygen jet cutting machine of the kind which automatically cuts a workpiece to shape it is sometimes necessary to indicate datum points on the plate, for locating purposes and for fixing the positions of brackets, holes and so on. It is known to achieve this marking by mounting on the cutting machine, close to the cutting burner, an air driven actuator (i.e., a device comprising a piston and cylinder) with a centre punch attached to the piston rod, the piston rod being arranged to drive the hardened point of the centre punch down on to the plate to make an impression. The air supply to the actuator is controlled by means of a solenoid valve which connects to high pressure air line to the cylinder. By manually operating a push button switch on the solenoid valve the air is admitted to the cylinder to actuate the punch. The principal object of the invention is to provide a circuit which is so arranged that the punch will either cycle continuously at a desired rate so that a row or outline of punch marks is produced, or which may be arranged to produce punch marks in response to marks on the outline, or which may if desired be operated manually.

The invention consists of an automatic punch control apparatus for use in an oxygen jet cutting machine comprising means to drive a marking punch into a workpiece to make a mark, and circuitry for automatically causing the punch to make marks on the workpiece either at regular predetermined intervals or in response to marks on the substrate carrying the outline which is being followed.

In one embodiment of the invention for making marks at regular predetermined intervals there is a first transistor having a capacitor in its input circuit which is gradually charged so that the conduction of the first transistor increases as the voltage across the capacitor increases, a second transistor having its input circuit connected to the output circuit of the first transistor, a relay having its energizing winding connected in the output circuit of the second transistor so that the voltage applied to the winding gradually increases until the relay operates, the relay having two contacts which are closed when the relay operates, closure of one contact causing the punch to be actuated and closure of the other contact discharging the capacitor, whereupon the relay is released and the cycle is repeated.

There may be a variable resistor in series with the capacitor by which the charging rate of the capacitor may be varied, so that the frequency of operation of the punch may be varied.

The punch may be operated by a pneumatic actuator controlled by a solenoid valve which is energized by the said one contact of the relay.

The circuitry for causing the punch to make marks in response to marks on the substrate may comprise means to scan a path on a substrate adjacent an outline which is being followed and parallel thereto, photosensitive means to receive an image of the part of the path being scanned and produce signals in response to marks on the substrate, an amplifier to amplify the signals, and a relay, a change in the signal due to the appearance of a mark on the substrate in the said path causing the relay to be energized whereby the punch is actuated to make a mark on the workpiece.

The invention will now be described, by way of example, with reference to the accompanying drawing, which shows in diagrammatic form the parts of the apparatus and the interconnecting circuitry for both forms of the invention.

Referring to the diagram, there is shown a steel plate 11 which is to be marked. This would be placed on the work support of the oxygen jet cutting machine in which the marking is to be carried out. A pneumatic actuator 12, consisting of a piston in a cylinder, is shown above the plate 11 and its position with respect to the plate at any instant will be controlled by a line follower (not shown) which is following an outline in the usual way and moving the cutting burner and the actuator as it travels. The piston rod of the actuator is provided with a conical centre punch 13 at its lower end. The actuator 12 may be of the single acting type with a spring return and it is connected by a pipe 14 to a solenoid operated air valve 15, by which air supplied through a high pressure line 16 is admitted to the actuator 12 when the solenoid 17 is energized. The solenoid 17 may conveniently be designed to operate on the ordinary mains supply voltage and frequency.

The cyclic operation of the actuator 12 and the punch 13 are controlled by a circuit comprising two transistors VT1 and VT2 which are both of n-p-n type. The collector of VT1 is connected directly to a positive power supply line 18 while the emitter of VT1 is connected through a resistor R1 to a negative supply line 19, which may also conveniently be a ground line. Connected between the positive supply line 18 and the base of VT1 is a fixed resistor R2 and a variable resistor RV1 in series, and connected between the base of VT1 and the negative line 19 is a capcitor C1 of high capacitance.

The emitter of VT1 is connected directly to the base of VT2, which is connected as an emitter follower. A resistor R3 is connected between the collector of VT2 and the positive supply line 18, while the winding of a relay RL1 is connected between the emitter of VT2 and the negative line 19, the moving contact SW1.2 of a switch SW1 being in contact with a fixed contact 40. The switch SW1 will be referred to again later. The relay RL1 has contacts RL1.1 and RL1.2. As shown, both contacts are normally open, and when the contacts are closed by energization of the winding RL1, the contact RL1.1 connects a resistor R4 in parallel with capacitor C1, while the closure of RL1.2 connects the mains supply to the solenoid 17.

In a practical circuit, R1 may have a value of 10K ohms, R2 may have a value of 1.2K ohms, R3 may have a value of 100 ohms, R4 may have a value of 100 ohms, RV may have a value of 25K ohms and C may have a value of 100 F. The voltage on line 12 may be +30 volts.

In operation, when the power to the lines 18 and 19 is switched on, VT1 and VT2 are both initially non-conductive, the capacitor C1 being discharged. The capacitor C1 begins to charge through resistors R2 and RV, the rate of charge being controlled by adjustment of RV. As soon as the voltage on capacitor C1 begins to rise, VT1 begins to conduct and the voltage drop across R1 by virtue of the emitter current of VT1 causes VT2 to conduct as well, the rise in voltage across R1 following closely the rise in voltage across the capacitor C1. The voltage drop across the winding of relay RL1 also rises with the voltage across capacitor C1 until the current flowing through the relay winding is sufficient to cause the relay to operate. The relay might, for example, operate when the voltage on its winding reaches 24 volts. The operation of the relay closes contacts RL1.1 and RL1.2. The closure of RL1.1 puts the resistor R4 in parallel with capacitor C to discharge it while the closure of RL1.2 applies the mains voltage to the solenoid 17 to open the valve 15, so that high pressure air is applied to the actuator 12 to drive the punch 13 hard down on to the plate 11 and produce a punch mark. As soon as capacitor C1 has discharged, VT1 becomes non-conductive and cuts off the conduction of VT2, so that relay RL1 releases and opens contacts RL1.1 and RL1.2, whereupon the solenoid valve 15 is closed, the air in the actuator cylinder being allowed to escape to atmosphere by the valve 15. The punch 13 is retracted and the charging of capacitor C1 begins all over again. The frequency with which the actuator 12 is operated depends on the charging rate of capacitor C1 and this in turn is controlled by the adjustment of variable resistor RV, which varies the time constant of the circuit.

The embodiment of the invention in which the punch marks are made in response to marks on the substrate which is being followed is shown on the right-hand part of the diagram. The surface of the substrate upon which the outline is carried is indicated by reference 29 and a small part of the surface of the substrate is indicated at 41 bearing a part of an outline 42 and a mark 20 lying in a path at the side of the outline 42. The image of a part of the outline passes through a lens 21, as indicated by the lines 22 defining a beam which is projected by the lens 21 on to a photosensitive element 23. This is for the purpose of normal scanning of the outline. An image of a portion of the parallel path lying at the side of the outline 42 is also projected by the lens 21, as indicated by lines 24, past a vibrating reed 25 to a second photosensitive element 26. The vibrating reed 25 is actuated by a solenoid 27 acting upon an armature 28, both of which are shown diagrammatically. The photosensitive element 26 is connected between the base of an n-p-n transistor VT3 and the negative or ground line 19. The base of VT3 is also connected through a resistor R5 to a positive supply line 30 and the collector of VT3 is directly connected to this line. The emitter of VT3 is connected through a resistor R6 to the ground line 19.

The vibrator 27, 28 may conveniently be actuated at mains frequency, that is, 50 c./s. or 60 c./s. and assuming that the photosensitive element 26 is "looking" at the white surface of the substrate a strong light signal impinges on the element 26 and it is continually interrupted by the vibrating reed 25. Since the resistor R5 is in series with the element 26 the voltage on the base of VT3 is continually varied upwardly and downwardly by the variation in the light signal reaching the element 26 and the circuitry is so arranged that this produces an alternating signal which appears across resistor R6 in the emitter circuit of VT3. This signal is passed on by a coupling capacitor C2 to the base of an n-p-n transistor VT4, the base of VT4 being initially biased by resistors R7 and R8 connected between the lines 30 and 19, the base of VT4 being connected to the junction of R7 and R8.

The emitter of VT4 is connected to the ground line 19 through a fixed resistor R9 and a variable resistor RV2 in series, RV2 being shunted by a capacitor C3. Since R9 is not by-passed, it provides a certain degree of negative feedback and the signal level may be adjusted by varying RV2.

A load resistor R10 is connected between the collector of VT4 and the supply line 30, and the output signal at the collector of VT4 is passed on by a coupling capacitor C4 to the base of an n-p-n transistor VT5. The base of VT5 is initially biased by being connected to the junction of two resistors R11 and R12 connected between the supply line 30 and the ground line 19. A resistor R13 is connected between the emitter of VT5 and the ground line 19 and this is by-passed by a capacitor C5.

A load resistor R14 is connected between the collector of VT5 and the supply line 30 and the output signal is passed from the collector of VT5 via a capacitor C6 to the anode of a diode 31 which is also connected through a resistor R15 to the ground line 19. Due to the presence of the diode 31 all the negative-going half-waves of the output signal VT5 are suppressed and the positive half-waves are passed through the diode 31 and a resistor R16 to one side of a capacitor C7 the other side of which is connected to the ground line 19. The capacitor C7 becomes charged to a certain level by the positive pulses. This signal level is applied to the base of an n-p-n transistor VT6 having its collector directly connected to the supply line 30 and having a resistor R17 connected between its emitter and the ground line 19.

The steady signal at the emitter of VT6 is passed through a reistor R18 to the base of an n-p-n transistor VT7 which has its emitter connected directly to the ground line 19. The winding of a second relay RL2 is connected between the collector of VT7 and the supply line 30. Relay RL2 is provided with changeover contacts RL2.1. The moving member 32 of contacts RL2.1 is connected to one side of a capacitor C8, the other side of which is connected to the ground line 19. A resistor R19 has one end connected to the supply line 30 and its other end connected to one fixed contact 33 of the set RL2.1 and also to one side of a push-button changeover switch SW2. The moving contact 34 of switch SW2 is normally in contact with the other fixed contact 35 which is connected to one side of a capacitor C9. Capacitor C9 has its other side connected to the ground line 19. When the push-button switch SW2 is operated a fixed contact 36, connected to the contact 35 is bridged to a contact 37 which is connected to the second fixed contact 38 of the changeover set RL2.1 and also to one fixed contact 39 of one pole of a double pole switch SW1.2. The other fixed contact 40 of SW1.2 is connected to the emitter of VT2 while the moving member of this switch is connected to one side of the relay coil RL1, the other side of which is connected to the ground line 19.

The second part SW1.1 of switch SW1 is connected between the supply line 30 and the line 31 so that when the switch SW1 is in the position shown the power supply from the line 30 is cut off from transistors VT1 and VT2.

In operation, and assuming that the portion of the substrate being "looked at" by the field of vision defined by the lens 24 is unmarked, a small part of the illuminated surface of the substrate is projected on to the photosensitive element 26 to produce an alternating signal which is amplified by VT3, VT4 and VT5. The rectified signal applied to VT6 is passed by emitter-follower action to VT7 and this keeps the winding of RL2 energized to hold the contact set RL2.1 in the position shown, in which the moving contact 32 is connected to the fixed contact 33, while the fixed contact 38 is disconnected, as is the fixed contact 37, so that the winding of relay RL1 is unenergized. If the manual push-button switch SW1 is actuated the voltage stored in capacitor C9 is applied via contacts 36 and 37 of switch SW2 and the contact 39 of switch SW1.2 to the winding of relay RL1, which operates to cause contacts RL1.2 to change over, and thereby cause air pressure to be applied to the actuator 12, whereupon the punch 13 makes a mark on the plate 11. As soon as the manual switch SW2 is released the capacitor C2 is enabled to recharge itself but it will be noted that the power applied to winding RL1 is limited to that stored in capacitor C9, so that the relay RL1 will only operate for a short time and will then release, even if the pushbutton switch SW2 is held operated for a long period of time.

Assuming that the field of view defined by the lens 24 reaches the mark 20 on the substrate 18, the amount of light which is periodically allowed to all on the photosensitive element 26 by the vibrating reed 25 is substantially reduced, so that the output signal from the element is altered and the signal applied to VT3 is greatly reduced. Consequently the output signal from VT5 is much smaller and the voltage across C7 falls substantially because the charge leaks away through the base-emitter circuit of VT6. The falling voltage on the emitter of VT6 causes the current through the winding of RL2 to be reduced to the point at which his relay releases. Hence the contact set RL2.1 changes over to bring the moving member 32 into engagement with the fixed contact 38. The effect is to connect the capacitor C8 to the winding of relay RL1, which is energized by the charge in C8 and operates to cause a mark to be made on the plate 11. In this case also only a single mark is made and the relay RL1 is only held in the operated condition for the period permitted by the stored charge in C8.

From the foregoing description it will be clear that by using only the left-hand part of the circuit containing VT1 and VT2 an automatic cycling arrangement is provided whereby the punch 13 is caused to make marks on the plate 11 at regular intervals as the line follower proceeds in following the outline. On the other hand, by using the right-hand part of the circuit alone, including transistors VT3 and VT7, an arrangement is provided by which the punch 13 will make marks on the plate corresponding to marks will appear on the substrate carrying the outline which is being followed, an additional facility for making manual marks on the plate 11 being provided. It will, of course, be evident that a push-button switch could also be incorporated in the circuitry containing VT1 and VT2 to allow for manual operation. By combining the two sets of circuitry and providing the switch SW1 it is possible to provide for making marks by means of a manual control corresponding to marks on the outline, or to make marks automatically at regular intervals all around the workpiece.

The elements 21, 23, 25 and 26 through 28 shown in the drawing are in practice incorporated in the casing of the line follower head, and the line follower head as a whole follows the outline 42 on the substrate 41, in accordance with established practice. The oxygen jet cutting burner is caused to follow precisely the same path, usually by means of a mechanical connection, and this is diagrammatically shown in the drawing, in which the dotted line 42 represents the mechanical connection while 43 generally indicates the cutting burner which has a body 44 and a jet 47 from which the oxygen jet flame issues, the gas supplies being conducted to the burner through flexible pipes 45 and 46.

Various modifications may be made to the circuitry described within the scope of the invention.

I claim:

1. An automatic punch control apparatus for use in an oxygen jet cutting machine having a cutting torch for automatically cutting a workpiece to the shape of an outline which is followed by a photoelectric line follower, the machine containing a marking punch mounted for movement with the cutting torch for making marks on the workpiece while it is being cut, comprising means to drive the marking punch into the workpiece, and actuating circuitry for the driving means including a first transistor having a capacitor in its input circuit whch is gradually charged so that the conduction of the first transistor increases as the voltage across the capacitor increases, a second transistor having its input circuit connected to the output circuit of the first transistor, a relay having its energizing winding connected in the output circuit of the second transistor so that the voltage applied to the winding gradually increases until the relay operates, the relay having two contacts which are closed when the relay operates, closure of one contact causing the punch to be actuated and closure of the other contact discharging the capacitor, whereupon the relay is released and the cycle is repeated.

2. Apparatus as claimed in claim 1 comprising a variable resistor in series with the capacitor by which the charging rate of the capacitor may be varied, whereby the frequency of operation of the punch may be varied.

3. Apparatus as claimed in claim 1 comprising a pneumatic actuator for the punch, and a solenoid valve to control the pneumatic actuator, the solenoid valve being energized by the closure of the said one contact of the relay.

4. An automatic punch control apparatus for use in an oxygen jet cutting machine having a cutting torch for automatically cutting a workpiece to the shape of an outline carried on a substrate, the outline being followed by a photoelectric line follower, the machine containing a marking punch mounted for movement with the cutting torch for making marks on the workpiece while it is being cut, the substrate bearing marks at points at which punch marks are to be made, comprising means to drive the marking punch into the workpiece to make a mark, means to scan a path on the substrate adjacent the outline which is being followed and parallel thereto, a lens to scan said path, photoelectric means to receive an image of the part of the path being scanned and to produce continuous signals, which change in response to marks on the substrata, a vibrating shutter in the light path to the photosensitive means to produce a varying signal, amplifying means including a transistor to which the varying signal is applied to produce an alternating signal, an amplifier to amplify the alternating signal, a diode to rectify the amplified signal, a further amplifier to amplify the rectified signal having a capacitor and leak resistor in its input circuit, a relay which is normally operated in the output circuit of the further amplifier, a power supply, and a capacitor normally connected to be charged by the power supply through contacts on the relay, the appearance of a mark on the substrata causing the amplitude of the alternating current to be reduced so that the voltage on the said capacitor falls and the relay releases, the changing of the relay contacts causing the charge in the capacitor to be applied to the means to drive the punch into the workpiece.

5. Apparatus as claimed in claim 2 comprising a pneumatic actuator for the punch, and a solenoid valve to control the pneumatic actuator, the solenoid valve being energized by the closure of the said one contact of the relay.

References Cited

UNITED STATES PATENTS

| 1,927,428 | 9/1933 | Weinberger | 83—371 X |
| 1,954,349 | 4/1934 | Dewey et al. | 83—365 X |
| 2,342,474 | 2/1944 | Klein et al. | 83—371 X |
| 2,674,308 | 4/1954 | Knobel | 83—365 X |
| 2,508,730 | 5/1950 | Stone | 33—27 |
| 3,114,205 | 12/1963 | Bechtle | 33—23 |

JAMES M. MEISTER, Primary Examiner

U.S. Cl. X.R.

83—2, 365; 266—23